United States Patent [19]

Hughes et al.

[11] 4,139,926
[45] Feb. 20, 1979

[54] TOOL FOR CUTTING MATERIALS AND METHODS FOR STERILIZING THE SAME

[75] Inventors: David R. Hughes, Phoenix, Ariz.; Richard F. Duncan, Jeffersonville, Ind.

[73] Assignee: Armour and Company, Phoenix, Ariz.

[21] Appl. No.: 806,468

[22] Filed: Jun. 14, 1977

Related U.S. Application Data

[62] Division of Ser. No. 652,405, Jan. 26, 1976, abandoned.

[51] Int. Cl.² .......................... B26B 25/00; A22B 5/20
[52] U.S. Cl. ...................................................... 17/52
[58] Field of Search .................. 17/23, 51, 52, 14, 67

[56] References Cited

U.S. PATENT DOCUMENTS

| | | | |
|---|---|---|---|
| 2,481,182 | 9/1949 | Waters | 17/67 X |
| 3,837,045 | 9/1974 | Blacker | 17/11 |
| 3,886,658 | 6/1975 | Wikoff | 17/23 X |

*Primary Examiner*—Louis G. Mancene
*Assistant Examiner*—Robert P. Swiatek
*Attorney, Agent, or Firm*—Frank T. Barber; Carl C. Batz

[57] ABSTRACT

A tool for cutting materials such as animal carcasses and portions of carcasses one after another, the tool including a cutting blade and a guard member, together with means for discharging against the blade and against the guard member hot water at sterilizing temperature for sterilizing the cutting blade and guard between their use in cutting different carcasses. The disclosure also deals with a process in which one carcass is cut using the tool, the tool withdrawn and the blade and guard then treated by discharging sterilizing water thereon before the tool is again used in the cutting of other carcasses.

6 Claims, 4 Drawing Figures

TOOL FOR CUTTING MATERIALS AND METHODS FOR STERILIZING THE SAME

This is a division of application Ser. No. 652,405 filed Jan. 26, 1976 and now abandoned.

This invention relates to a saw or cutting device for use on meat carcasses or the like and to methods and apparatus for sterilizing the same.

BACKGROUND

In meat packing houses where animal carcasses are cut into halves, quarters or other portions, it has been the practice to use portable, motorized saws to saw through the bone as well as the meat.

It is important in such operations, in the event one carcass becomes contaminated or infected, that such contamination or infection not be transferred to other carcasses on which the same saw is subsequently used; and to preclude such occurrence it has been required that the saw be sterilized by dipping it in hot water between carcasses. Pursuant to this requirement the saw operator has followed the procedure of dipping his saw in water having a temperature of at least 180° F. after he has used the saw to sever each carcass and before he again uses the saw to sever another carcass. To do this, the operator must swing his saw about from his work and take the time and trouble to dip the saw in the hot water and again swing it back into position hopefully before the next carcass comes to his position. Further, the hot water in which he dips his saw receives debris from the saw, and even though the water be at sterilizing temperature the saw when it is dipped may come into contact with the debris from prior carcasses.

We have sought methods for sanitizing the saws in such operations which methods are easier to perform and more effective for sanitizing purposes, and we have sought apparatus for carrying out such improved methods.

Further, we recognize that for safety sake it is necessary that the circular saw blades used for such purpose have suitable guards, and that such guards must also be sterilized as well as the saw blades themselves.

DESCRIPTION

According to our improved method and apparatus, sterilizing water is projected against the saw blade and guard member between the sawing operations without need for the operator to maneuver his saw or move it from one position to another. One embodiment of apparatus for carrying out this procedure is illustrated in the accompanying drawings and is described in detail herein.

In the drawings, FIG. 1 is a view in side elevation showing one side of the saw and guard structure;

Figure 1:
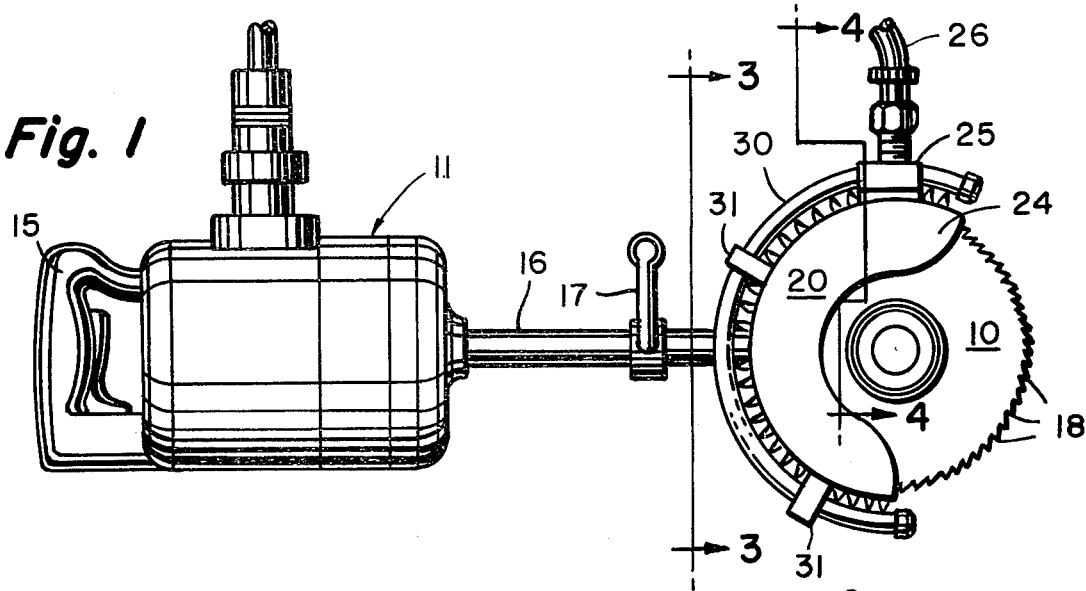
Figure 2:
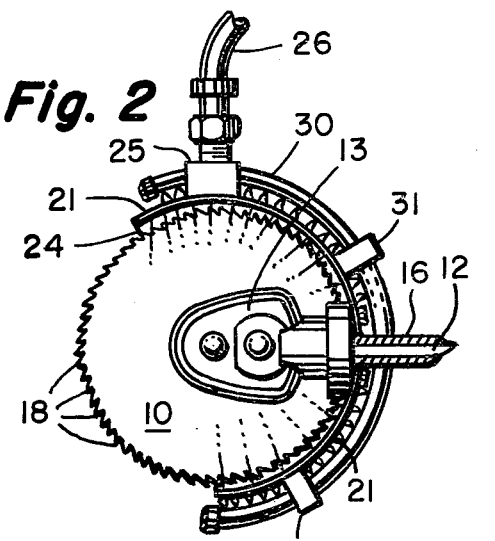
FIG. 2 is a view of the other side of the saw and guard structure.

As illustrated, the apparatus includes a circular cutting blade 10 which is rotatably driven by a motor 11 through a shaft 12 and gearing mechanism 13.

The motor is connected to an electrical power source by cable 14. A handle 15 is provided at the end of the motor. The shaft 11 is protected by casing 16, and a handle 17 is attached to the shaft casing. This provides a tool which is portable. The operator may grasp the handle 15 with one hand and the handle 17 with the other hand and so move the blade into contact with an animal carcass while the carcass is suspended on a moving conveyor so as to cut the carcass as it passes by on the conveyor.

The cutting blade 10 is circular and has a cutting edge at its periphery. Preferably this cutting edge is that of a saw having teeth 18, but the tool could also be used with a blade having a plain knife edge or a serrated edge.

Figure 3:
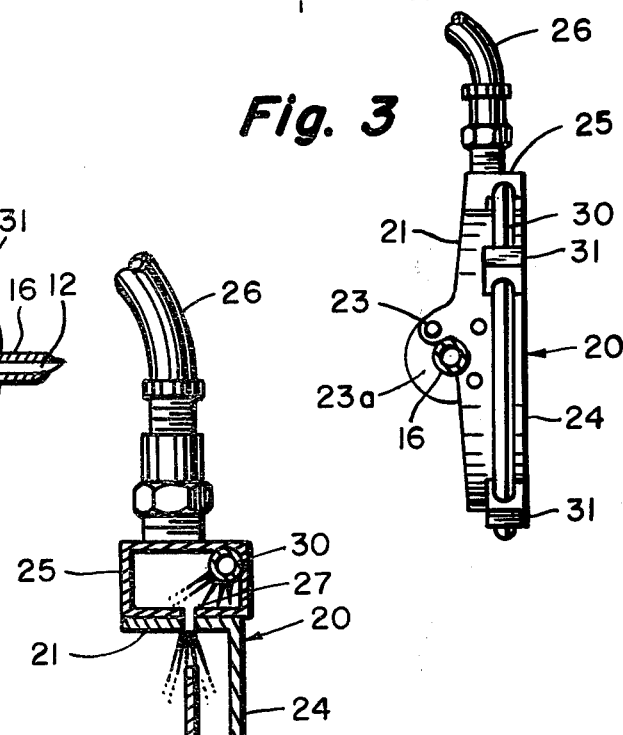
FIG. 3 is a view of the saw and guard structure as seen from the line 3—3 of FIG. 1.

Cutting blade 10 is protected by a guard 20 which is an angle piece including an arcuate band or strap 21 which extends about and is spaced from the cutting blade. This strap 21 extends part way about the cutting blade and is concentric with the blade. As shown more clearly in FIG. 3 this band 21 has a boss 22 on its inside which extends about the casing 16 and is secured to a connecting plate 23a which is, in turn, secured to the casing. The guard is thus held in place with the strap 21 uniformly spaced from the edge of the blade.

Figure 4:
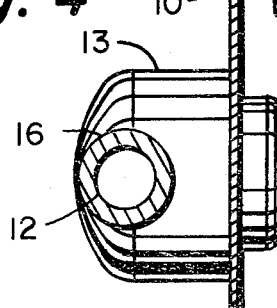
FIG. 4 is an enlarged detail view showing the apparatus, partly in section, as seen from line 4—4 of FIG. 1.

A vertical plate 24 is joined at right angles with the strap 21 (See FIGS. 1 and 4) and serves to protect the front side of the cutting blade.

A casing 25 is attached to the strap 21 and this casing is connected by the tube 26 with a source of hot water under pressure. A valve (not shown) is connected in the hot water line and some means is provided for controlling the flow of the water into the casing. Preferably, such control takes the form of a foot pedal which the operator of the tool may operate with his foot to turn on and off the flow of hot water into the casing 25.

An opening 27 is provided through the bottom of casing 25 and through the guard strap 21, through which water from casing 25 is discharged onto the cutting blade. The opening 27 provides structure which guides and directs the water in the nature of a nozzle as it is discharged against the cutting blade. The opening and the nozzle which it provides is aligned with the plane of the cutting blade so that the water issuing from this nozzle in the form of a stream or spray is directed against the edge of the blade and contacts the blade on both sides. In this way the entire surface of the blade is contacted by the water. We use the term "protected" to include putting the hot water against the blade or the guard in the form of a stream or spray in contrast to the immersion of the device according to prior practice. In accordance with our methods the blade may continue to rotate as the water is discharged through the opening against it.

The improved device also includes a tube 30 made of aluminum or other metal or plastic material which is in the form of an arc and which is concentric with the guard strap 21 and is secured to strap 21 by means of bracket 31. Tube 30 is spaced from strap 21 and is positioned just over the front edge portion of strap 21 where it is substantially in alignment with the guard plate 24. Tube 30 is open to the interior of casing 25 and water is received from the interior of casing 25 into the tube 30.

Tube 30 is provided with spaced perforations along its length and in its inside wall, the inside wall being the side of the tube facing the guard. These perforations have a radial direction with respect to the tube so that some of the perforations direct water straight against the guard, some of them direct water against the guard in directions slanted toward one side and some of them direct water against the guard slanted toward the other side. Thus, the water so discharged covers the entire area of the guard strap 21 and also the guard plate 24. In this way both the blade and the guard are sterilized. Suitably, the operator may release his foot control to stop the flow of sterilizing water after the flow has continued for a short period, because the flow of water is not needed after sterilization has taken place. After the flow has stopped he may then press the cutting blade against the next carcass which comes by his station on the conveyor. By this sequence of steps the carcasses may be cut one after another and both the cutting blade and the guard are sterilized between carcasses. This relieves the operator from turning his tool from his work and dipping it in hot water as was the prior practice. Also it enables more positive and complete sterilization with clean water without danger of contamination between carcasses and without contact with debris from prior usage.

Further, the prior practice of dipping the blade and associated equipment into hot water between use on the different carcasses tends to deteriorate the gearing mechanism rapidly, and this deterioration is largely avoided by use of the improved tool as herein described.

While we have illustrated and described only certain embodiments of our invention, it will be understood to those skilled in this art that many embodiments may be constructed and utilized and many changes may be made all within the spirit of the invention and the scope of the appended claims.

We claim:

1. A method for cutting animal carcasses comprising passing the carcasses consecutively on an overhead rail past a cutting station, contacting one of said carcasses as it passes said station with the rotating blade of a portable cutting saw to sever said carcass, removing said blade from said one carcass, projecting water under pressure and having a temperature of at least 180° F. against said blade after said blade is removed from said one carcass and while said blade is free from said carcasses to sterilize said blade, and then contacting said blade after sterilization with a second one of said carcasses as it passes said station to sever the same.

2. A method as set forth in claim 1 in which said tool has an arcuate guard spaced from the periphery of said blade and including the step of projecting water under pressure at a temperature of at least 180° F. against the outside of said guard at the same time as water is projected against said blade.

3. A method as set forth in claim 2 which includes discharging said water from a series of spaced sources arcuately arranged about said guard and against the outside of said guard.

4. A method as set forth in claim 2 in which said water is projected from spaced apertures in an arcuate tube spaced from the outside of said guard.

5. A method as set forth in claim 3 in which said blade is in rotation when said water is projected against it.

6. A method as set forth in claim 1 in which said water is projected from a point in the plane of said blade and outside the periphery of said blade and in which said water is projected against the edge of said blade.

* * * * *